UNITED STATES PATENT OFFICE.

GEORGE F. J. COLBURN, OF NEWARK, NEW JERSEY, ASSIGNOR TO WILLIAM M. WELLING.

IMPROVEMENT IN COMPOSITIONS FOR DENTAL PLATES, &c.

Specification forming part of Letters Patent No. 67,025, dated July 23, 1867; reissue No. 5,572, dated September 16, 1873; application filed August 22, 1873.

*To all whom it may concern:*

Be it known that I, GEORGE F. J. COLBURN, of Newark, in the county of Essex and State of New Jersey, have invented a new and Improved Composition Applicable to Plates for Artificial Teeth, &c.; and I do hereby declare that the following is a specification thereof.

This invention relates to a new and improved composition, available for the plates in which artificial teeth or teeth and gums are set. The object of the invention is to obtain a composition that is tough and strong, and which will admit of being manufactured or molded into the desired form. When used for dental purposes the teeth or teeth and gums set into it with far greater facility than hitherto, and which will also possess the advantage of admitting of repairs being made (broken teeth replaced) with far less difficulty than with either the metallic (gold) plate, or with the hard-rubber or vulcanite plate.

The basis of my improved composition consists of gum shellac mixed with a substance which will deprive it of its frangibility and give the requisite degree of toughness.

In the course of my experience I have found the fibrous mineral usually known as asbestus to answer this purpose in an eminent degree.

The following I have used successfully: No. 1, gum shellac, one ounce; No. 2, asbestus, seven pennyweights; No. 3, oxide of zinc, six pennyweights; No. 4, sulphur, one pennyweight, six grains; No. 5, chalk, one pennyweight. These ingredients are put into a mortar and pulverized and then fused or melted together.

The composition thus formed, when softened by heat, may be molded into plates to suit the mouth, in substantially the same way as is practised to form the hard-rubber plates, and the teeth or teeth and gums may be secured in the plate by means of pins in the same manner as teeth are secured in the hard-rubber plates.

My invention simply requires to be molded into the proper form. No afterheating or baking is required as in using the vulcanite or hard-rubber plates, and in case a tooth be broken from the plate a new one can be inserted in it and united by fusion at a comparatively low temperature, whereas with the vulcanite or hard-rubber plates they require, after a new tooth is inserted in them, to be subjected to a high heat in a retort, in order to unite the parts by fusion, as the vulcanite fuses only at a high temperature, and the process occupies considerable time. This composition is very strong, and it is but little affected by the ordinary circumstances of exposure.

I claim as my invention—

1. The composition of gum shellac and asbestus, substantially as set forth.

2. The plate for artificial teeth composed of the materials and substantially as set forth.

Signed by me this 18th day of August, A. D. 1873.

G. F. J. COLBURN.

Witnesses:
J. F. WALLARD.
W. H. RACE.